United States Patent [19]
Goodman et al.

[11] Patent Number: 6,019,380
[45] Date of Patent: Feb. 1, 2000

[54] ADAPTIVE MONOSKI FRAME

[76] Inventors: Michael L. Goodman, 20755 SW 238th Pl., Sherwood, Oreg. 97140; Paul Charron, 3884 Mission Rd., St. Paul, Oreg. 97137; Russell Bartlett, 61125 Landreth La., St. Helens, Oreg. 97051

[21] Appl. No.: 08/940,653

[22] Filed: Sep. 30, 1997

[51] Int. Cl.$^7$ .................................................. B62B 9/04
[52] U.S. Cl. ..................... 280/28.14; 280/14.1; 280/22.1
[58] Field of Search ............................. 280/28.14, 22.1, 280/845, 12.14, 14.1, 16, 288.1, 809; 297/85, 801, 69, 423.19

[56] References Cited

U.S. PATENT DOCUMENTS

| | | | |
|---|---|---|---|
| 3,325,179 | 6/1967 | Bissett | 280/28.14 |
| 3,632,125 | 1/1972 | Krippelz | 280/28.14 |
| 3,799,564 | 3/1974 | Eisenchmid | 280/16 |
| 3,917,301 | 11/1975 | Fabris | 280/12 |
| 4,193,609 | 3/1980 | Bissett | 280/28.14 |
| 4,310,169 | 1/1982 | Brough | 280/28.14 |
| 4,324,409 | 4/1982 | Larsen et al. | 280/12 |
| 4,632,408 | 12/1986 | Olpp et al. | 280/16 |
| 4,848,841 | 7/1989 | Giselsson | 297/423.19 |
| 5,518,080 | 5/1996 | Pertile | 180/190 |

*Primary Examiner*—Lanna Mai
*Assistant Examiner*—Jeff Restifo
*Attorney, Agent, or Firm*—Marger Johnson & McCollom, P.C.

[57] ABSTRACT

A mono-ski frame adapted for skiing in the sitting position and designed to allow a rearward and downward traverse of the upper portion of the frame relative to the lower portion during loaded conditions to enhance the carvability during the turn. The mono-ski frame includes a lower frame having a forward end and a rearward end adapted to be attached to a ski. A foot rest is attached to the forward end of the lower frame. An upper frame having a seat mounted thereon is moveable relative to the lower frame via a first link arm. The first link arm is pivotally attached at a first position to the lower frame and at a second position to the upper frame, wherein the first position is located forwardly of the second position so that the seat attached to the upper frame travels in a rearward direction under loaded conditions. A shock absorber adapted to minimize the transfer of vibration between the lower frame and the upper frame is coupled between the upper and lower frames and includes a piston assembly and a spring coupled to the piston assembly for biasing the piston assembly toward an extended uncompressed position.

20 Claims, 6 Drawing Sheets

ADAPTIVE MONOSKI FRAME

BACKGROUND OF THE INVENTION

This invention relates generally to skiing equipment and more particularly to a mono-ski frame for use with adaptive ski systems.

Skiing has traditionally occurred in the standing position. However, this position is unattainable to less-abled persons such as those with certain spinal injuries, multiple sclerosis and other conditions. New adaptive ski equipment such as the mono-ski has been developed which allows such persons to ski while sitting down. Such monoskis are manufactured by Radventure, Inc. and A.T. Freedom Factory, Inc. and typically include a frame on which a seat and foot rest are suspended.

More specifically, these monoski frames include a lower rigid frame portion affixed to the skis and an upper rigid frame portion on which the seat and foot rest are fixed. A spring and/or air shock absorbing piston couples the upper frame with the lower to decrease the vibration transmitted to the ski seat when the ski frame is in use. Furthermore, in one common embodiment, these two frame portions are rotatably moveable relative to one another along a forwardly located pivot coupling the upper and lower frame portions together. Alternately, the upper frame portion is coupled to the lower frame portion by forwardly directed (from the lower to upper frame) pivoted link arms.

When a skier attempts a turn, it is desireable to place weight on the front of the skies to initiate a turn, complete the steering phase, and then place weight on the back of the skis to complete the turn. The effective arc created by these three phases of the turn are referred to as the "carvability" of the ski. Under typical performance or loaded conditions with the prior art monoski systems described above, the skier's weight causes the shock absorber to compress and decompress as the skier goes into and out of turns. It is difficult for a less-abled skier to maintain weight over the back of the skies during a turn using these prior art systems since the upper rigid portion of the monoski frame rotates forward when the shock absorber is under compression. Consequently, the steering control of the monoski under loaded conditions is reduced.

Accordingly, a need remains for a monoski frame in which a skiers' moving weight is directed toward the tail of the skis during the completion phase of the turn.

SUMMARY OF THE INVENTION

A monoski frame constructed according to a preferred embodiment of the invention and adapted for skiing in the sitting position is designed to allow a rearward and downward traverse of the upper portion of the frame relative to the lower portion during loaded conditions to enhance the carvability during the turn. The mono-ski frame includes a lower frame having a forward end and a rearward end with means for attaching the lower frame to a ski. A foot rest is attached to the forward end of the lower frame. An upper frame, having a seat mounted thereon, is moveable relative to the lower frame via a first link arm. The first link arm is pivotally attached at a first position to the lower frame and at a second position to the upper frame, wherein said first position is located forwardly of the second position so that said seat attached to said upper frame travels in a rearward and downward direction under loaded conditions. A shock absorber, adapted to minimize the transfer of vibration between the lower frame and the upper frame, is coupled between the upper and lower frames and includes a piston assembly and a spring coupled to the piston assembly for biasing the piston assembly toward an extended uncompressed position.

The mono-ski frame constructed according to the invention appears to confer several advantages over prior art systems. First, by transferring the weight of the seated skier rearward on the ski, a skier's control in coming out of a turn is increased. Additionally, by loading the tail of the mono-ski during the compression of the shock absorber and resulting bias of the shock absorber in the extended position, the mono-ski is forced or propelled at a greater rate out of a turn and into the next one. Finally, dampening and stability of the seated skier within the frame is increased by isolating the movement of the feet from the seat. The suspension system according to the present invention articulates at the skier's knees thus helping to isolate the majority of weight transfer over the center of the ski within the "binding platform zone."

The foregoing and other objects, features and advantages of the invention will become more readily apparent from the following detailed description of a preferred embodiment of the invention which proceeds with reference to the accompanying drawings.

DETAILED DESCRIPTION

Figure 1:
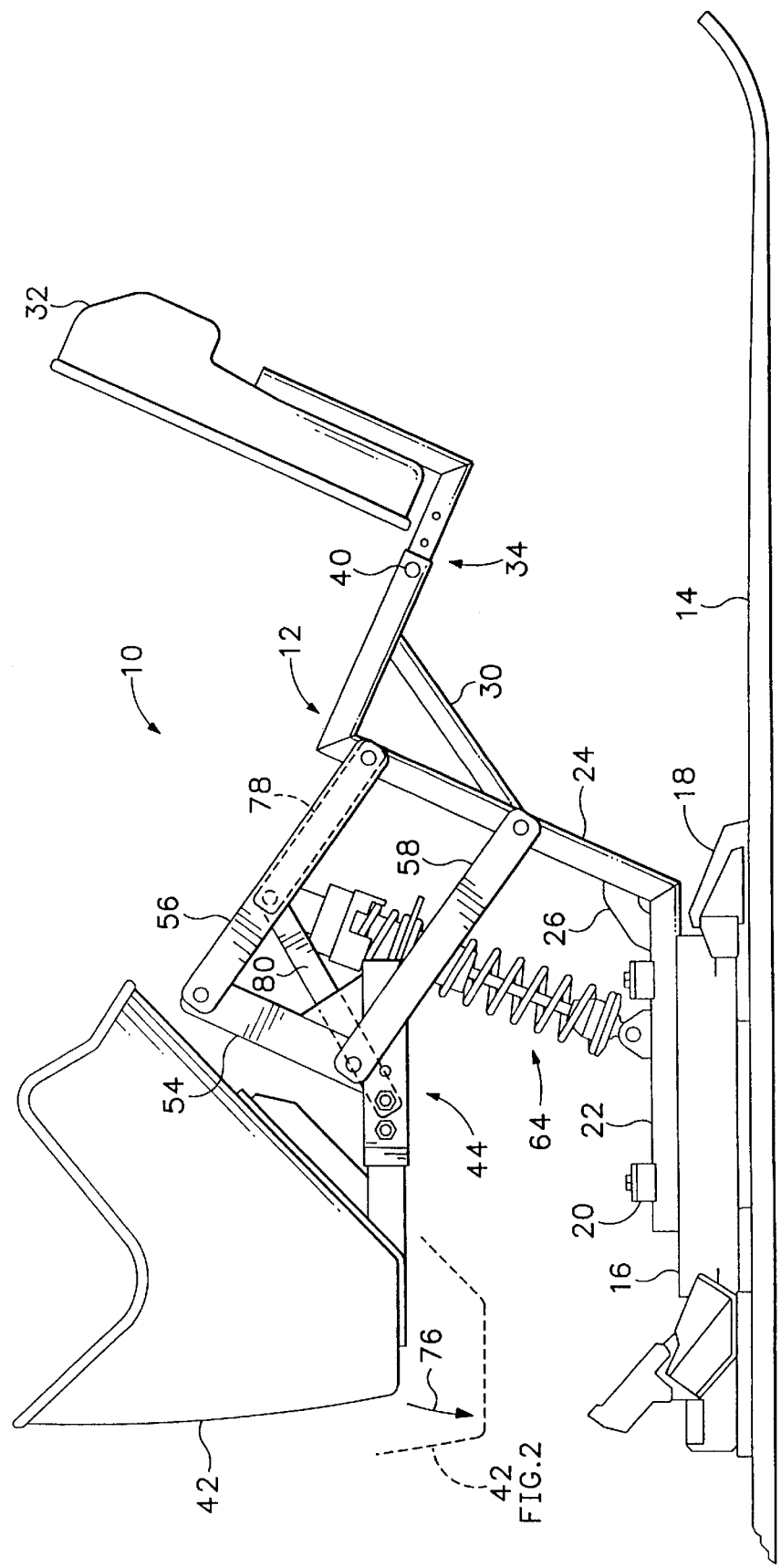
FIG. 1 is a side elevation view of a mono-ski frame and ski constructed according to the preferred embodiment of the invention.
Figure 2:
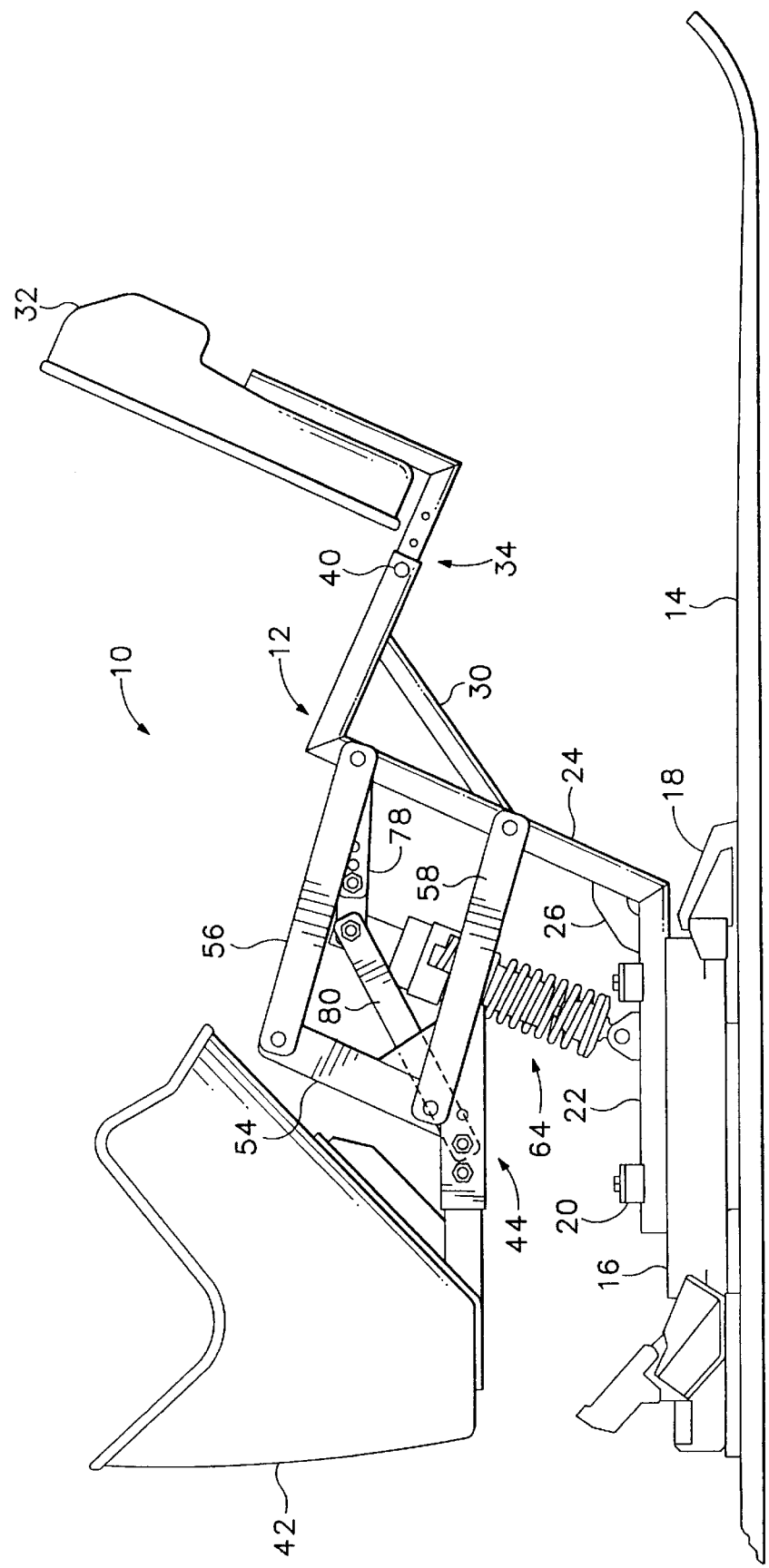
FIG. 2 is a side elevation view of the mono-ski of FIG. 1 in a compressed or loaded position.

A mono-ski frame constructed according to a preferred embodiment of the invention is shown generally at 10 in FIGS. 1 and 2. Mono-ski frame 10 includes a lower frame 12 having a forward and a rearward end corresponding to the forward and rearward end of ski 14 to which the mono-ski frame is attached. In a preferred embodiment, the means for attaching the lower frame 12 to ski 14 is a monoski adaptor as described in detail in applicants' copending application Ser. No. 08/904,433 which is incorporated by reference for all purposes. Briefly, the mono-ski adaptor includes a body 16 sized to fit within a standard ski binding 18 and clamping flanges 20 that clamp a horizontal frame element 22 of the lower frame 12 to the adaptor body 16. Though the mono-ski adaptor as shown in FIG. 1 is the preferred method for attaching the lower frame of the invention to the ski, other means for attaching can be used such as simply bolting the horizontal frame element 22 of the lower frame 12 to the ski 14 itself.

Lower frame 12 also preferably includes an upwardly angled member 24 welded to the horizontal frame element 22 and supported by gusset 26. A forwardly located portion 28 (FIG. 3) of the lower frame is welded to angled member 24 and is supported by another gusset 30. The open Z-shape formed by elements 22,24,28 has been found to confer a desired rigidity to the lower frame 12 that is useful under performance conditions.

A foot rest 32 adapted to retain the feet of a skier is attached to the forward end 28 of the lower frame 12. The foot rest preferably includes foot rest adjustment means 34 for moving the foot rest relative to the mono-ski frame and adapting the frame 10 to comfortably fit differently sized skiers. As shown best in FIG. 3, the foot rest adjustment means 34 includes a foot rest mount 36 having a plurality of bores 38 defined therethrough that are adapted to be secured within the hollow frame or tubing of portion 28 via a bolt, pin or screw 40. Depending upon the bore 38 selected, the foot rest can be moved back and forth to thus decrease or increase the distance between the foot rest 12 and seat 42.

Mono-ski frame 10 also includes an upper frame 44 with seat 42 attached thereto. The seat preferably includes seat adjustment means similar in operation to the foot rest adjustment means 24 described above. Namely, referring to FIG. 3, the seat adjustment means includes a seat rail 48 having a plurality of bores (not shown) defined therethrough that are adapted to be secured within the hollow frame or tubing of the upper frame horizontal member 50 via a plurality of bolts 52. Upper frame 44 also includes an upwardly angled member 54 welded to horizontal member 50 wherein angled member 54 is substantially parallel to the angled member 24 of the lower frame.

Frame components can be constructed from varying materials that are known in the industry, for instance chromalloy steel and aluminum. Other possible materials would include composite fiber and/or titanium.

Turning again to FIGS. 1–3, the lower and upper frames 12,44 are coupled together via first and second link arms 56,58. The first link arm 56 is pivotally attached at a first position 60 to the angled member 24 of the lower member 12 and at a second position 62 to the angled member 54 of the upper frame 44. As shown in the drawings, the link arm 56 is attached to the lower frame 12 at a position that is located forwardly and downward from the link arm 56 attachment to the upper frame 44. Similarly, the second link arm 58 is attached between the angled member 24 of the lower frame 12 and the angled member 54 of the upper frame in spaced parallel relation to the first link arm 56.

The mono-ski frame 10 also includes shock absorbing means 64 coupled between the lower frame 12 and the upper frame 44 for dampening any vibration that would be transmitted from the ski 14 to a skier sitting in the seat 42. The coupling means will be described in detail below with reference to FIGS. 3–8.

Figure 3:
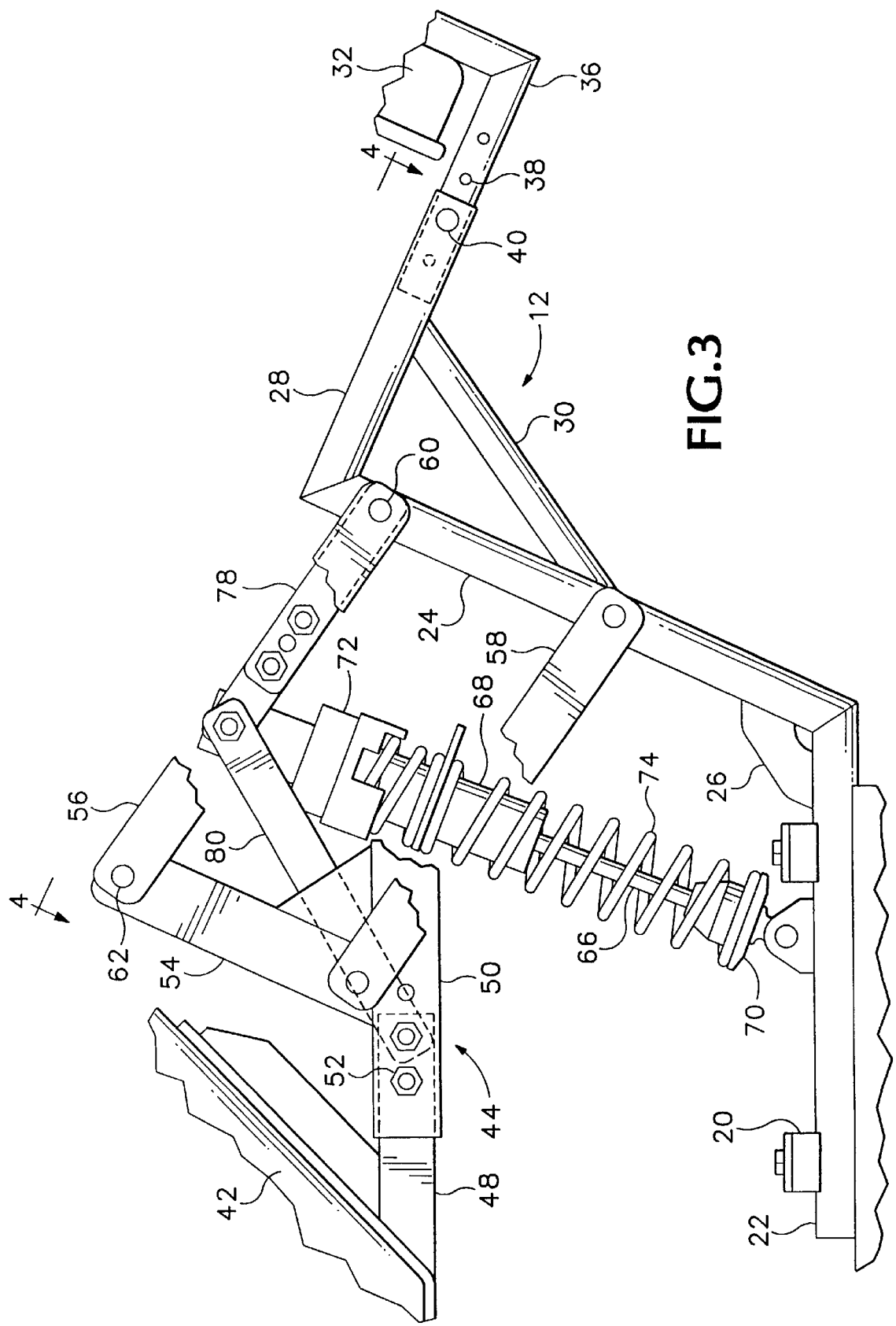
FIG. 3 is a magnified and partially sectioned side elevation view of the mono-ski frame of FIG. 1 showing one embodiment of the shock absorbing means.

FIG. 3 shows the shock absorbing means in greater detail. The means preferably includes a piston assembly formed by a rod 66 and shock body 68 captured between lower and upper shoulders 70,72 that moves from an extended uncompressed position (as shown in FIGS. 1 and 3) to a compressed position (as shown in FIG. 2) when the upper frame is placed under a loaded condition as when undergoing a turn or hitting a mogul on the ski slopes. In order to bias the piston assembly toward an extended uncompressed position, a spring 74 is coupled to the piston, preferably by surrounding the piston assembly, between shoulders 70,72.

Using the type of linkage described above, the seat 42 of the mono-ski travels in a rearward and downward direction (shown in FIG. 1 by arrow 76) as the seat 42 transitions between an unloaded condition with the piston assembly 64 uncompressed, and performance or loaded condition with the piston assembly compressed. For illustrative purposes, FIG. 1 shows in solid lines the position of the seat in the unloaded condition and in dashed lines the position of the seat when the frame 10 is under compression.

All of the travel, through the compression of the suspension which is designed to provide a smooth controllable ride of the mounted ski, moves from the center of the ski at initiation, backwards and downwards towards the tail of the ski during compression and then returns to the center of the ski once completed. During this movement, the seat remains parallel with the ski as a result of horizontal lower and upper horizontal frame elements 22,50. The rider's moving weight is transferred over the "binding platform zone" (that area of the ski to which the ski binding 18 is attached), thus enhancing control.

By moving the mono-skiers' weight back during the compression of the mono-ski, the skier weights the tail of the conventional ski. The back weighting of the mono-ski helps to complete the skier's turn as the conventional ski is intended to do. Also, by loading the tail of the mono-ski during compression, the mono-ski is forced or propelled at a greater rate from the end of the turn due to the spring effect or loading placed on the conventional ski which then sets the rider up for the forward initiation needed to maneuver the next turn.

Another advantage that this new design incorporates is increased dampening and stability by substantially isolating the foot rest 32 from the seat 42. The mono-ski frame's suspension system articulates at the riders knees thus helping to isolate the majority of weight transfer over the center of the ski within the "binding platform zone." The foot rest section is part of the lower frame 12 which makes the frame more rigid and separates any foot movement from the actual suspension of the mono-ski.

Figure 4:
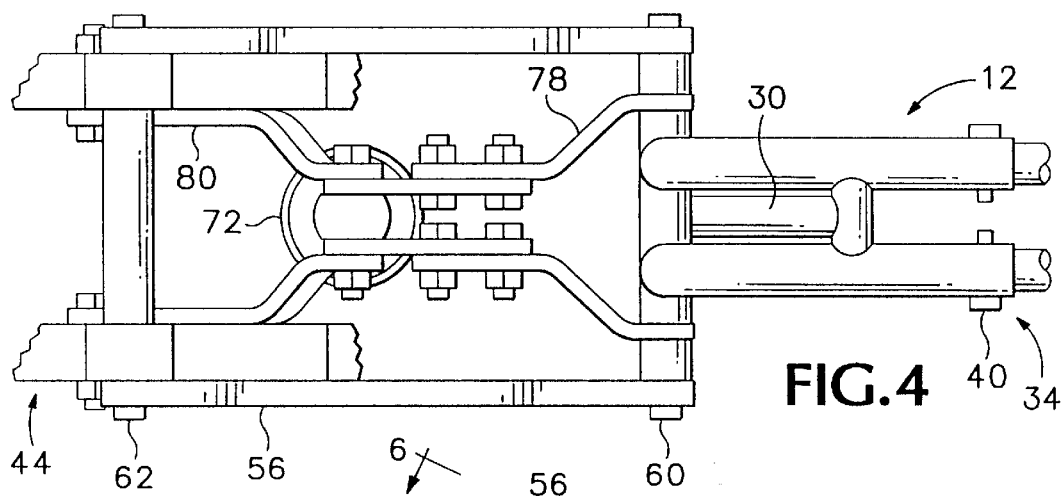
FIG. 4 is a top view of the shock absorbing means of FIG. 3 taken along line 4—4.
Figure 5:
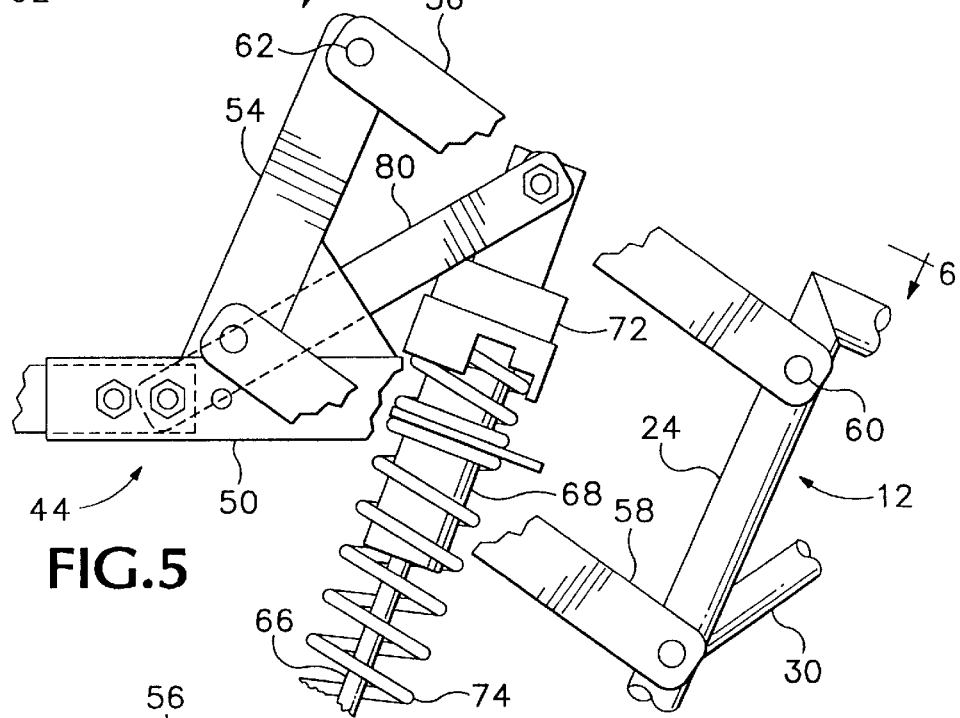
FIG. 5 is a magnified and partially sectioned side elevation view of the mono-ski frame of FIG. 1 showing another embodiment of the shock support structure.
Figure 6:
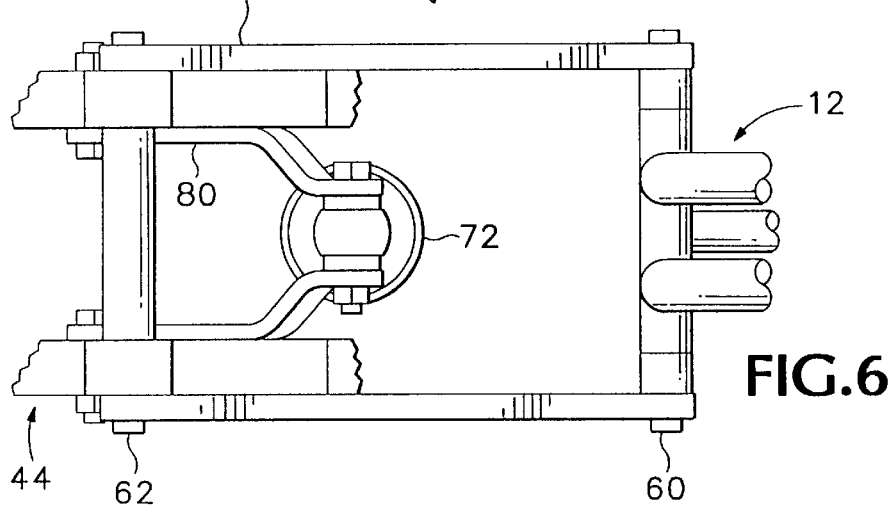
FIG. 6 is a top view of the shock absorbing means of FIG. 5 taken along line 6—6.
Figure 7:
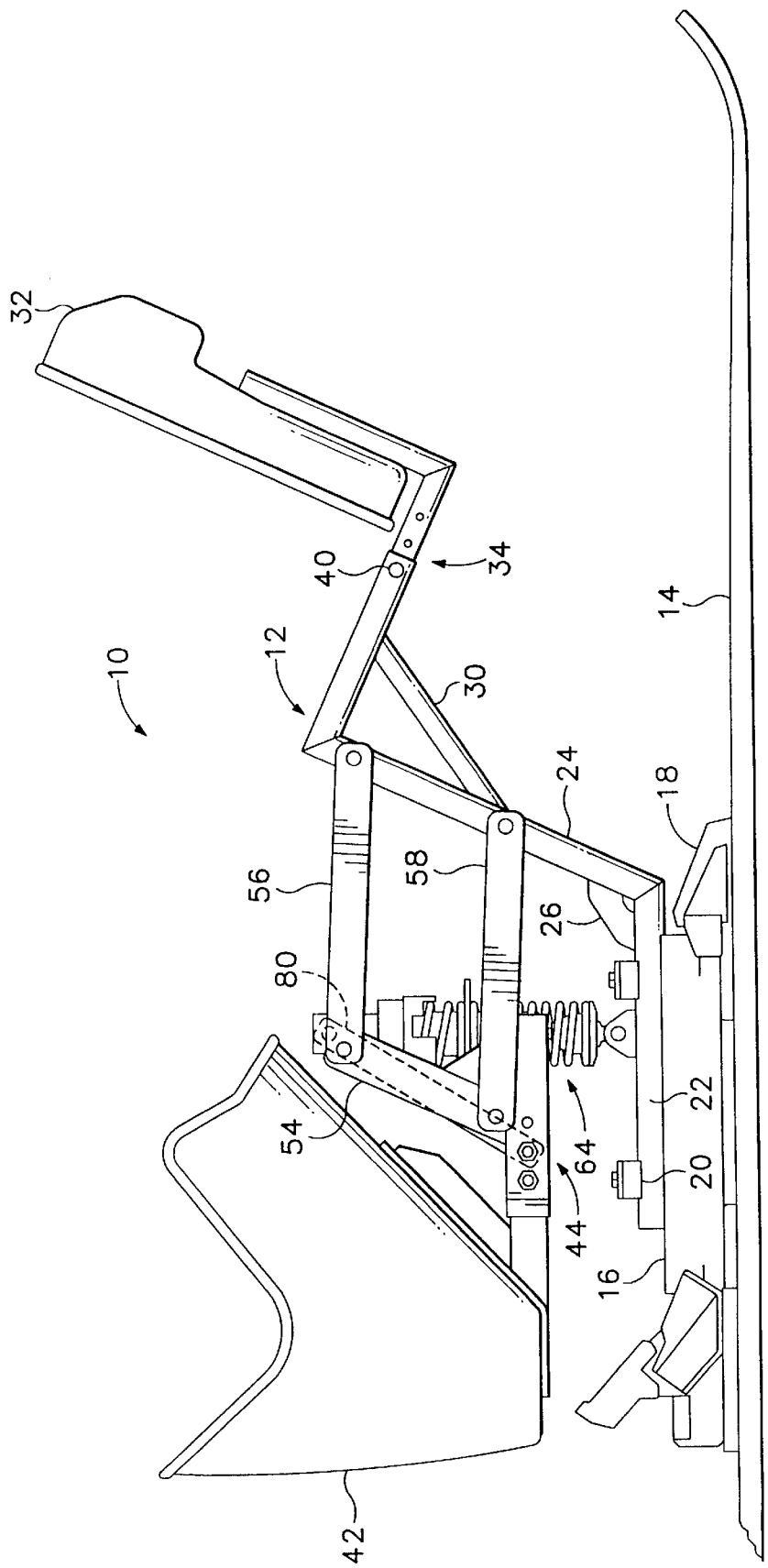
FIG. 7 is a side elevation view of a mono-ski frame and ski having the shock support structure of FIG. 5 in a compressed or loaded position.
Figure 8:
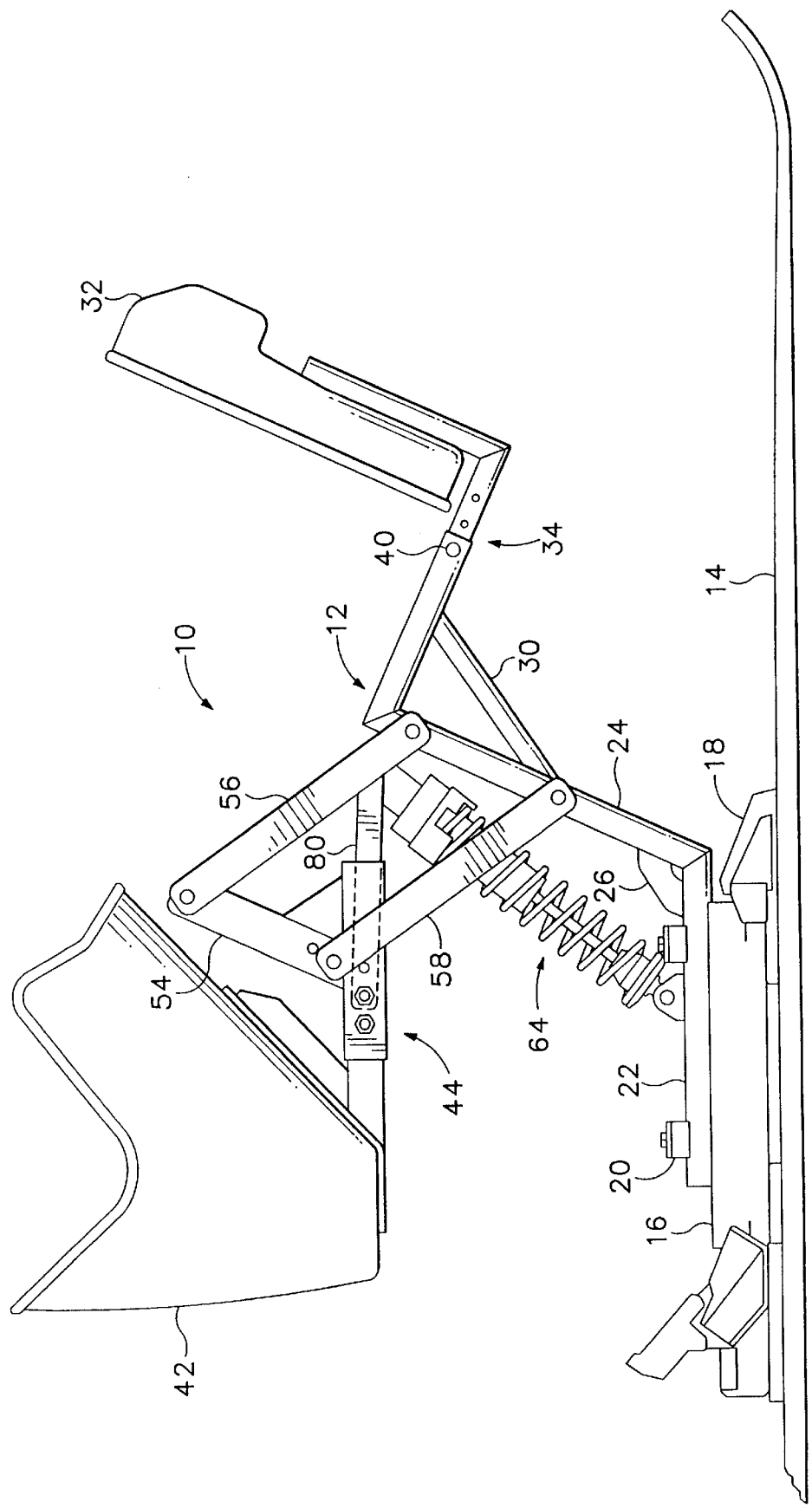
FIG. 8 is a side elevation view of a mono-ski frame and ski having the shock support structure of FIG. 5 with the seat in a raised position.

FIGS. 3 and 4 illustrate one method of attachment of the shock absorbing means between the upper frame 44 and the lower frame 12. As shown, the upper end of shoulder 72 pivotally attaches to shock tower arms 78,80, which in turn pivotally attach to lower frame 12 and upper frame 44 respectively. Attachment of the two shock tower arms 78,80 to the shock absorbing means acts to suspend the shock absorbing means away from the lower and upper frames 12,44 and imparts rigidity to the system for increased performance. Additionally, arms 78,80 allow articulation of the shock and, consequently, backward and downward movement of the seat 42.

FIGS. 5–8 illustrate another method of attachment of the shock absorbing means between the upper frame 44 and the lower frame 12. The seat 42 of conventional mono-skies are constructed with a low center of gravity for maximum stability by positioning the seat close to the ski. In this position, the seat sits too low for the chair lift to easily engage the seat. Competitive adaptive skiers are able to raise their body weight in such a way as to lift the seat just high enough to engage the chair lift. It has been found, however, that recreational handicapped skiers often lack the required upper body strength, balance, and skill necessary to use the chair lift with the mono-ski. Accordingly, the shock tower arm 78 has been removed from the embodiments shown in FIGS. 1–4 to allow the shock absorber to be rotated toward the upwardly angled member 24 of lower frame 12 via shock tower arm 80 as shown best in FIG. 8. When the shock absorber is rotated, the upper frame horizontal member 50 can be separated a greater distance from the lower frame horizontal member 22, thus allowing the seat to be lifted upward, gaining more height, to enable the mono-ski to engage the chair lift.

Having described and illustrated the principles of the invention in a preferred embodiment thereof, it should be apparent that the invention can be modified in arrangement and detail without departing from such principles. For instance, the link arms 56,58 of the frame suspension can be made different lengths to adjust the position and leverage ratios of the skier to enhance their particular skiing ability. Further adjustments can be made by shortening or lengthening the frame via the seat section or foot section. The height of the rider is also adjustable by differing the position on the mono-ski frame at which the shock tower arms are mounted. We claim all modifications and variation coming within the spirit and scope of the following claims.

We claim:

1. A mono-ski frame comprising:
    a first frame assembly having a forward and a rearward end;
    means for attaching said first frame assembly to a ski;
    a foot rest attached to the forward end of the first frame assembly;
    a second frame assembly;
    a seat attached to the second frame assembly; and
    a first link arm pivotally attached at a first position to the first frame assembly and at a second position to the second frame assembly, wherein said first position is located forwardly of said second position so that said seat attached to said second frame assembly travels in a rearward direction under loaded conditions.

2. The mono-ski frame according to claim 1, further including shock absorbing means coupled between said first frame assembly and said second frame assembly for dampening the transmission of vibration between the first frame assembly and the second frame assembly.

3. The mono-ski frame according to claim 2, wherein said shock absorbing means includes a piston assembly that moves from an extended uncompressed position to a compressed position when said second frame assembly is placed under a loaded condition.

4. The mono-ski frame according to claim 3, wherein said shock absorbing means includes a spring coupled to said piston assembly for biasing said piston assembly toward said extended uncompressed position.

5. The mono-ski frame according to claim 1, further including foot rest adjustment means for moving said foot rest relative to said seat to allow skiers of different sizes to comfortably fit within the mono-ski frame.

6. The mono-ski frame according to claim 1, further including seat adjustment means for moving said seat relative to said foot rest to allow skiers of different sizes to comfortably fit within the mono-ski frame.

7. The mono-ski frame according to claim 1, further including a second link arm pivotally coupled between said first frame assembly and said second frame assembly in spaced parallel relation to said first link arm.

8. A mono-ski frame comprising:
    a first frame assembly adapted to be attached to a ski, said first frame assembly having a forward and a rearward end;
    a foot rest fixedly attached to the first frame assembly, said foot rest adapted to retain the feet of a skier;
    a second frame assembly moveable under loaded conditions relative to said first frame assembly in a rearward direction toward said first frame assembly rearward end;
    a seat attached to the second frame assembly and moveable substantially independently of said foot rest to thereby allow a skier's knees to articulate as the second frame assembly transitions between loaded and unloaded conditions.

9. The mono-ski frame of claim 8, further including a first link arm having one end pivotally connected to said first frame assembly at a first position, and having said other end pivotally connected to said second frame assembly at a second position upward and rearward of said first position.

10. The mono-ski frame according to claim 8, further including shock absorbing means coupled between said first frame assembly and said second frame assembly for dampening the transmission of vibration between the first frame assembly and the second frame assembly.

11. The mono-ski frame according to claim 10, wherein said shock absorbing means includes a piston assembly that moves from an extended uncompressed position to a compressed position when said second frame assembly is placed under a loaded condition.

12. The mono-ski frame according to claim 11, wherein said shock absorbing means includes a spring coupled to said piston assembly for biasing said piston assembly toward said extended uncompressed position.

13. The mono-ski frame according to claim 8, further including foot rest adjustment means for moving said foot rest relative to said seat to allow skiers of different sizes to comfortably fit within the mono-ski frame.

14. The mono-ski frame according to claim 8, further including seat adjustment means for moving said seat relative to said foot rest to allow skiers of different sizes to comfortably fit within the mono-ski frame.

15. A mono-ski frame comprising:
    a first frame assembly adapted to be attached to a ski, said first frame assembly having an upwardly angled member adjacent a forward end thereof;
    a second frame assembly moveable in a rearward and downward direction under loaded conditions relative to said first frame assembly;
    first and second link arms in spaced parallel relation to one another, each of said arms pivotally connected at one end to said upwardly angled member and at another end to said second frame assembly; and
    shock absorbing means coupled between said first frame assembly and said second frame assembly for dampening the transmission of vibration between the first frame assembly and the second frame assembly.

16. The mono-ski frame according to claim 15, further including:
    a foot rest fixedly attached to the first frame assembly, said foot rest adapted to retain the feet of a skier; and
    a seat attached to the second frame assembly and moveable substantially independently of said foot rest to thereby allow a skier's knees to articulate as the second frame assembly transitions between loaded and unloaded conditions.

17. The mono-ski frame according to claim 16, further including a first shock tower arm pivotally connected between the shock absorbing means and the second frame assembly.

18. The mono-ski frame according to claim 17, further including a second shock tower arm connected between the shock absorbing means and the first frame assembly, wherein said first and second shock tower arm are adapted to substantially fix the position of the shock absorbing means relative to the seat.

19. The mono-ski frame according to claim 2, further including a shock tower arm pivotally connected between the second frame assembly with an upper end of the shock absorber means.

20. The mono-ski frame according to claim 19, further including a second shock tower arm pivotally connected between the first frame assembly with the upper end of the shock absorber.

* * * * *